United States Patent
Leong et al.

(10) Patent No.: US 9,374,215 B2
(45) Date of Patent: *Jun. 21, 2016

(54) COMMUNICATION SYNCHRONIZATION

(71) Applicant: NXP B.V., Eindhoven (NL)

(72) Inventors: Frank Leong, Veldhoven (NL); Andries Hekstra, Eindhoven (NL); Arie Koppelaar, Giessen (NL); Stefan Drude, Waalre (NE)

(73) Assignee: NXP B.V., Eindhoven (NL)

( * ) Notice: Subject to any disclaimer, the term of this patent is extended or adjusted under 35 U.S.C. 154(b) by 7 days.

This patent is subject to a terminal disclaimer.

(21) Appl. No.: 14/468,317

(22) Filed: Aug. 25, 2014

(65) Prior Publication Data

US 2016/0056950 A1 Feb. 25, 2016

(51) Int. Cl.
| | |
|---|---|
| H04L 7/00 | (2006.01) |
| H04L 12/26 | (2006.01) |
| G06K 7/10 | (2006.01) |
| G06K 19/077 | (2006.01) |
| H04B 5/00 | (2006.01) |
| H04J 3/06 | (2006.01) |
| H04W 4/00 | (2009.01) |
| H04W 56/00 | (2009.01) |
| H04W 4/02 | (2009.01) |

(52) U.S. Cl.
CPC .......... *H04L 7/0037* (2013.01); *G06K 7/10237* (2013.01); *G06K 19/07766* (2013.01); *H04B 5/00* (2013.01); *H04J 3/0682* (2013.01); *H04L 7/0012* (2013.01); *H04L 43/0864* (2013.01); *H04W 4/008* (2013.01); *H04W 56/00* (2013.01); *H04W 4/023* (2013.01)

(58) Field of Classification Search
CPC .......................... H04L 7/0037; H04L 43/0864
See application file for complete search history.

(56) References Cited

U.S. PATENT DOCUMENTS

| 7,444,118 B2 | 10/2008 | Boh et al. |
| 8,620,394 B2 | 12/2013 | Sebastiano et al. |
| 2012/0105219 A1 | 5/2012 | Kofler |

(Continued)

OTHER PUBLICATIONS

AMS, AS3932 Datasheet—Applications "3D Low Frequency Wakeup Receiver", Revision 1.7, pp. 1-34, www.ams.com/LF-Receiver/AS3932.

(Continued)

*Primary Examiner* — Donald Mills
*Assistant Examiner* — Henry Baron
(74) *Attorney, Agent, or Firm* — Rajeev Madnawat

(57) ABSTRACT

Aspects of the present disclosure provide communications between local and remote devices having low-frequency (LF) and high-frequency (HF) circuits. As may be implemented in accordance with one or more embodiments, the local device transmits an LF signal to the remote device, which synchronizes its clock based on the LF signal. Another LF signal is communicated from the local device to the remote device using a reduced quality factor, which can be implemented to facilitate synchronization. The clock is resynchronized based on the second LF signal and used to transmit an HF signal with a time delay. The local device synchronizes its clock based on the HF signal, and transmits another HF signal to the remote device using the clock and another time delay. The remote device re-synchronizes its clock based on the second HF signal while accounting for a trip time for communicating the first and/or second HF signals.

20 Claims, 5 Drawing Sheets

(56) References Cited

U.S. PATENT DOCUMENTS

2013/0214732 A1    8/2013  Nowottnick
2015/0029758 A1*   1/2015  Jacobson .......... H02M 3/33576
                                                          363/17

OTHER PUBLICATIONS

M. van Elzakker et al., "A 10-bit Charge-Redistribution ADC Consuming 1.9 uW at 1 MS/s," IEEE JSSC, May 2010.

I.-Y. Lee et al., "A Fully Integrated TV Tuner Front-End with 3.1dB NF, >+31dBm OIP3, >83dB HRR3/5 and >68dB HRR7," IEEE ISSCC, 2014.

Harpe et al., "A 0.47-1.6 mW 5-bit 0.5-1 GS/S Time-Interleaved SAR ADC for Low-Power UWB Radios," IEEE JSSC, Jul. 2012.

J. van Sinderen et al., "Wideband UHF ISM-Band Transceiver Supporting Multichannel Reception and DSSS Modulation," IEEE ISSCC, 2013.

* cited by examiner

COMMUNICATION SYNCHRONIZATION

Aspects of various embodiments are directed to communications, and to communication synchronization.

Many communication approaches require synchronization and authentication, which have been implemented using a multitude of approaches. For instance, RF ranging systems often employ a time-of-flight principle to determine a distance between two objects, or markers on objects, that are communicating between one another. Proximity can be used from a security and authentication perspective, such as by ensuring that a remote device to be connected to a local device via Bluetooth is within a predetermined threshold distance of the local device (e.g., to prevent unwanted connections to other Bluetooth devices in relative proximity).

In many applications, a waveform (e.g., a chirp or a pulse) can be transmitted and reflected or retransmitted by an object. Based on the amount of time it takes for the reflection or retransmission to return to the original transmitter, the distance between the objects can be ascertained.

While various approaches have been implemented for communications in these regards, degradation of the radio signals (e.g., attenuation and reflection) can pose problems. Timing misalignment, interference from other (radio) systems and thermal noise from various sources can also pose problems. With particular regard to timing misalignment, detecting and correcting for such issues can involve an undesirable amount of time and power. For instance, in applications in which packet data is involved, the preamble of the packets can be relatively long compared to the payload, which has an effect on latency and power consumption. These issues can be particularly relevant to certain types of communications, such as in automotive access.

These and other matters have presented challenges to communications and related aspects such as timing alignment, for a variety of applications.

Various example embodiments are directed to communication circuits, methods and their implementation.

According to an example embodiment, communications are effected between a local device having a low-frequency (LF) transmitter and a high-frequency (HF) transceiver, and a remote device having an LF receiver and an HF transceiver. A first LF signal is transmitted from the local device to the remote device, and a clock is synchronized at the remote device based on the first LF signal. After transmitting the first LF signal, a second LF signal is transmitted from the local device to the remote device using the synchronized clock, in which the second LF signal is processed with a reduced quality factor at the local and remote devices to facilitate detection of the second LF signal at the remote device with reduced phase ambiguity. At the remote device, the clock is re-synchronized based on the processed second LF signal, and the re-synchronized clock is used to transmit a first HF signal with a first predetermined time delay relative to receipt of one of the first and second LF signals. Another clock is synchronized at the local device based on the first HF signal, and a second HF signal is transmitted to the remote device using the local device's synchronized clock and a second predetermined time delay relative to receipt of the first HF signal at the local device. The remote device's clock is re-synchronized again, based on the second HF signal, while accounting for a trip time for at least one of: communicating the first HF signal from the remote device to the local device, and communicating the second HF signal from the local device to the remote device.

Another example embodiment is directed to a method for authenticating wireless communications between devices. A first LF signal is communicated between the devices, and a clock is synchronized at a first one of the devices, based on the first LF signal. After communicating the first LF signal, damping circuits (e.g., resonant tanks) are activated or connected at the respective devices, and a second LF signal is communicated between the devices using the damping circuits to reduce a quality factor (e.g., of tuning circuits used for transmission and reception of the second LF signal). This approach can facilitate detection of the LF signal. The clock is then re-synchronized based on the second LF signal, and the re-synchronized clock is used in communicating a first HF signal, which may include an encrypted message, from the first one of the devices to a second one of the devices. Another signal (e.g., including an encrypted message) is communicated back to the first device in a second HF signal, and communications between the devices are authenticated based upon the round-trip time for transmitting and retransmitting the signals. As such, communications in this regard may refer to transmission and reception at the first one of the devices, at the second one of the devices, or at both the first and second devices.

Another embodiment is directed to an apparatus having LF and HF communication circuits. The LF communication circuit communicates a first LF signal from a local device to a remote device, and provides synchronization of a first clock circuit at the remote device via the first LF signal. The LF communication circuit then communicates a second LF signal from the local device to the remote device via the synchronized first clock circuit, reducing a quality factor of the communication and thereby facilitating detection of the second LF signal at the remote device with reduced phase ambiguity. Re-synchronization of the first clock circuit is provided via the second LF signal. The HF communication circuit communicates a first HF signal from the remote device to the local device with a first predetermined time delay, relative to receipt of one of the first and second LF signals, via the re-synchronized first clock circuit, and provides synchronization of a second clock circuit based on the first HF signal. The HF communication circuit then communicates a second HF signal from the local device to the remote device using the second clock circuit and a second predetermined time delay, relative to receipt of the first HF signal at the local device. Re-synchronization of the first clock circuit is provided via the second HF signal and a trip time for at least one of: communicating the first HF signal from the remote device to the local device, and communicating the second HF signal from the local device to the remote device.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
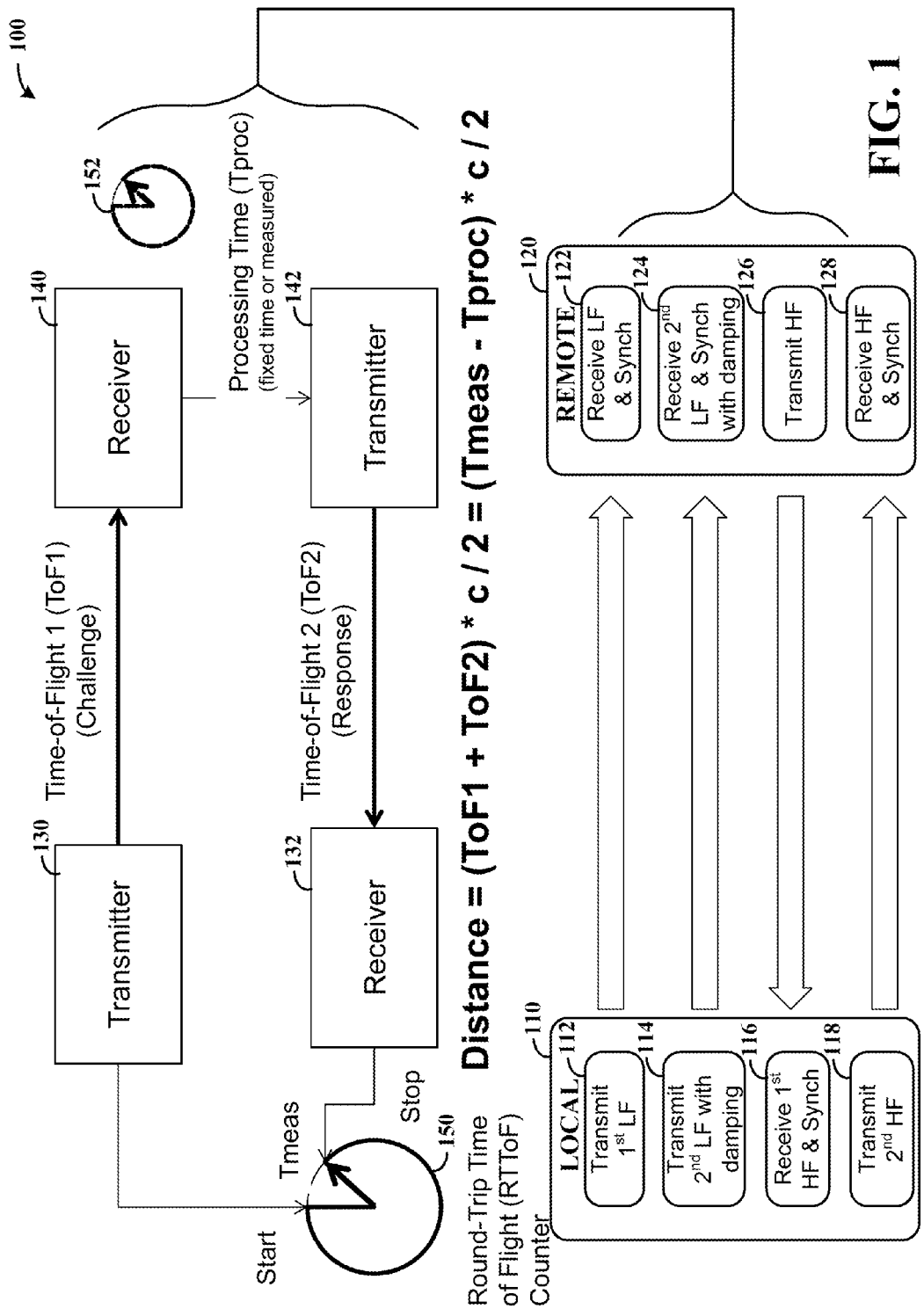
FIG. 1 shows a communication apparatus and approach involving synchronization and time-of-flight calculation, as may be implemented in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving data communication and synchronization. While not necessarily so limited, various aspects may be appreciated through a discussion of examples using this context.

Various example embodiments are directed to reducing timing uncertainty by damping, such as to lower the peak slope of the phase of a resonant tank's impedance versus frequency, used in receiving the signals to facilitate detection thereof. Such an approach may, for example, be implemented for reducing timing uncertainty in low-frequency (e.g., 125 kHz) applications by reducing the quality factor of a resonant tank at one or both of a transmitter and receiver. In a particular implementation, a two-step approach is used in which an LF transceiver is used to provide coarse synchronization by establishing a link (e.g., via polling) to another LF transceiver, and to provide a first estimation of range (distance) between transceivers based on signal strength and the coarse timing synchronization. Next, one or both LF transceivers enable damping circuits and transmit another (damped) LF signal between one another via the damping. The damped LF signal is used to pre-synchronize HF transceivers that operate for RF ranging.

Quality factor reduction, as characterized herein, may be implemented in one or more of a variety of manners. For instance, the operation of a tuning circuit used in transmitting and/or receiving LF signals can be damped. Exemplary approaches are shown in and described in connection with FIGS. 4 and 5. Further, one or more of these approaches may be implemented to artificially increase loss at the respective circuits, which can improve timing. For instance, by reducing the peak slope of the phase of the impedance in the frequency domain (e.g., in a resonant tank), reception of the signal can be improved (e.g., relative to a short chip or other signal peak).

In various embodiments, the quality factor of an LF communication is reduced by activating a switch for connecting circuitry that reduces the quality factor of a resonant tank in a magnetic transmitter or receiver, or equivalently damping the resonant tank. For instance, aspects of the tank circuit such as an equivalent resistance can be modified to reduce the quality factor (e.g., as may pertain to a ratio of power stored to power dissipated). This reduces the peak slope of the phase of the tank's impedance, and thereby also the peak slope of the phase of the related transfer function. The consequence is that detuning of the damped tank results in smaller phase variation compared to the un-damped tank, or reduced error in the timing information derived after the transfer function is applied to an input signal. In connection with various embodiments, it has been recognized/discovered that, when resonant tanks are detuned by disturbances in the surrounding magnetic field, the timing information obtained at a magnetic receiver can be accurate if either the transmitter's resonant tank, the receiver's resonant tank, or both are damped or have their quality factors reduced. Further, with this approach the quality factor of respective tanks need not necessarily be measured, which could otherwise slow the communication process.

Accordingly, these embodiments can be implemented for reducing power requirements for synchronization. Certain embodiments operate to reduce required on-time by synchronizing two radio nodes over a parallel LF radio link, thereby significantly reducing overall system power consumption. Other embodiments involve communications carried out for data packets in which the preamble includes data that can be used to address ambiguities in frequency, phase and time, and/or to facilitate power-saving duty-cycled packet detection, which can be effected before the payload of the packet starts.

With this approach, listening and synchronization-related latency can be limited, reducing or minimizing power consumption and latency overhead of the RF ranging link. LF transceivers used in this regard may, for example, include 125 kHz magnetic links and 13.56 MHz NFC (near-field communication) links.

According to another example embodiment, LF and HF signals are communicated between a local device and a remote device as follows. A first LF signal is transmitted from an LF transmitter in the local device to an LF receiver in the remote device, and the remote device synchronizes its clock based on the first LF signal. The LF transmitter subsequently transmits a second LF signal to the LF receiver, with a reduced quality factor at one or both of the local and remote devices. Such a reduced quality factor may be achieved, for example, via a resonant tank circuit, and may implement detection of the second LF signal at the remote device with reduced phase ambiguity (e.g., reducing the peak slope of the phase of the impedance in the frequency domain of the resonant tank circuit). At the remote device, the first clock is then re-synchronized based on the second LF signal (e.g., also based on the initial synchronization).

The remote device then transmits a first HF signal with a first predetermined time delay, relative to receipt of one of the first and second LF signals, using the re-synchronized clock. The local device then synchronizes its clock based on the first HF signal (and in some implementations, the first predetermined time delay). The local device transmits a second HF signal to the remote device using a second predetermined time delay, relative to receipt of the first HF signal and via synchronization of its clock. The remote device re-synchronizes its clock again, based on the second HF signal, and accounts for a trip time for at least one of communicating the first HF signal from the remote device to the local device, and communicating the second HF signal from the local device to the remote device. Additional HF signals can be communicated between the devices, to improve trip time estimates, with the respective trip times being used at one or both of the local and remote devices.

Accounting for a trip time in this regard may, for example, include determining a round-trip time for the HF signals, such as by communicating an encrypted message in the HF signals and determining the round-trip time (including any delay). Further, the respective communications (and device(s)) may be authenticated based on the round-trip time, by using the time to provide an estimate of distance or proximity between the devices. As such, secure communications can be effected, based on both the determined distance and the encrypted message. Moreover, by damping the respective tuning circuits (e.g., damping resonant tanks) used for LF communications during the LF synchronization, the overall process of authentication can be carried out in a timely and relatively low-power manner, which may also provide a reduced processing burden at one or both devices. As such, issues such as those discussed in the background section above may be addressed.

The reduced quality factor in the communication of the second LF signal may be achieved in one or more of a variety of manners. For instance, such an approach may involve mitigating detuning effects upon the transmission and/or reception of the second LF signals, by reducing the quality factor of a tuning circuit via increased damping with the second LF signal in the frequency domain at the local device and/or remote devices. A particular manner in which the quality factor may be reduced involves reducing a quality factor of a tank resonator used in transmitting and/or receiving the second LF signal. The resonator (or other damping circuit) may be switched on for the second LF communication. The amount of damping can be controlled relative to a target distance between the local and remote devices for which the communications are to be authenticated.

The communication approaches, as characterized herein, may be implemented in a variety of applications. In some embodiments, one or both of the local and remote devices operate using duty-cycled packet detection for packets having a preamble that is longer than a payload of the packet. The devices transmit and receive the LF signals respectively using an LF transmitter and an LF receiver, and transmit and receive the HF signals using HF transceivers that are respectively separate from the LF transmitter and the LF receiver. With this approach, both power consumption and latency overhead due to RF ranging in the communications can be minimized.

Another embodiment is directed to an apparatus (or system) having LF and HF communication circuits. The LF communication circuit communicates a first LF signal from a local device to a remote device, and provides synchronization of a first clock circuit at the remote device via the first LF signal. Communication in this regard (and discussed as follows) may, for example, involve signal transmission, reception, or both. The LF communication circuit communicates a second LF signal from the local device to the remote device, with a reduced quality factor. For instance, by reducing the quality factor of a resonant tank circuit at both transmission and reception of the second LF signal, the signal can be readily detected relative to phase ambiguity.

The first clock circuit is resynchronized using the second LF signal, and the HF communication circuit uses the resynchronized clock to communicate a first HF signal from the remote device to the local device. The HF signal can be communicated with a first predetermined time delay, relative to receipt of one of the first and second LF signals, and provides synchronization of a second clock circuit (at the local device) based on the first HF signal. The HF communication circuit then communicates a second HF signal from the local device to the remote device using the second clock circuit and a second predetermined time delay, relative to receipt of the first HF signal at the local device. The first clock circuit is re-synchronized based on the second HF signal and a trip time (e.g., round-trip time) for one or both of communicating the first HF signal from the remote device to the local device, and communicating the second HF signal from the local device to the remote device.

Consistent with the above, the LF and HF circuits may be implemented in the local device, the remote device, or in both. In some embodiments, the LF communication circuit and the HF communication circuit may be part of the remote device, with the LF communication circuit including an LF receiver, and the remote device including the first clock circuit. In some implementations, the remote device also includes a tuning circuit that receives the LF signals and operates in a damping mode for receiving the second LF signal, by reducing a quality factor of the tuning circuit, relative to a quality factor used for receiving the first LF signal.

In certain embodiments, the LF communication circuit and the HF communication circuit are part of the local device, with the LF communication circuit including an LF transmitter and the local device also including the second clock circuit. The local device may further include a tuning circuit that transmits the LF signals and operates in a damping mode by reducing a quality factor of the tuning circuit, relative to a quality factor used for transmitting the first LF signal.

In other embodiments, the apparatus (or system, as it may be) includes both the local and remote devices, having one or more aspects as above. In a particular implementation, the remote device includes the first clock circuit and a first tuning circuit, and the local device includes the second clock circuit and a second tuning circuit. The first tuning circuit receives the LF signals and operates in a damping mode for receiving the second LF signal, by reducing a quality factor therein, relative to a quality factor used for receiving the first LF signal. The second tuning circuit transmits the LF signals and operates in a damping mode for transmitting the second LF signal, by reducing a quality factor therein, relative to a quality factor used for transmitting the first LF signal.

In a more particular embodiment, the HF communication circuit communicates an encrypted message from the remote device to the local device via the first HF signal, and communicates the encrypted message from the local device back to the remote device via the second HF signal. An authentication circuit authenticates the remote device for accessing the local device based on a round-trip time for communicating the encrypted message from the remote device to the local device, and from the local device back to the remote device. The respective tuning circuits include tank resonators that are used in communicating the signals with the reduced quality factors.

Turning now to the figures, FIG. 1 shows a communication apparatus 100 and approach involving synchronization and time-of-flight calculation, as may be implemented in accordance with various embodiments, some of which may employ other time-of-flight determination. At a local device 110, an LF signal is transmitted at block 112, and the signal is received and processed at remote device 120 for clock synchronization and providing a time delay at block 122. After the first LF communication, the local and remote devices 110 and 120 employ damping circuits to respectively transmit and receive a second LF signal at blocks 114 and 124, which is used at the remote device for further synchronization using the synchronization obtained at block 122.

The remote device 120 then transmits a first HF signal at block 126, based on the synchronization at block 124 and a time delay, with the signal being received at block 116 of the local device 110. The local device 110 uses the first HF signal to carry out synchronization and time delay aspects at block 116, and transmits a second HF signal at block 118. The remote device 120 uses the second HF signal to re-synchronize its clock at block 128 and, for example, to compute trip time or round-trip time for one or both of the HF signals, which can be used for verifying distance between the local and remote devices. In this regard, coarse synchronization can be effected via the initial LF signal, and used to facilitate timing alignment via subsequent HF signals.

In a particular time-of-flight implementation, transmitter 130 (e.g., corresponding to 120/126) sends a time-of-flight challenge signal to receiver 140 (e.g., corresponding to 110/116). Transmitter 142 (e.g., corresponding to 110/118) responds with a time-of-flight response signal that incorporates processing time at 152 (e.g., a predetermined delay or measured processing time), which is received by receiver 132 (e.g., corresponding to 120/128), where the processing time provides a delay between the receiver 140 and transmitter 142. A time-of-flight counter 150 (e.g., employed at remote device 120) determines time elapsed between transmission of the time-of-flight challenge by transmitter 130 and reception of the time-of-flight response at receiver 132. Distance between the devices can then be determined based on the total time, less processing time at the receiver/transmitter 140/142, and any added delay as discussed above.

Such an approach may, for example, be carried out with the transmitter and receiver 130 and 132 at the local device 110, and the receiver 140 and transmitter 142 implemented at the remote device 120 as suggested above. Further, the time-of-flight may pertain to the initial LF signal and the first HF signal. Such an approach may also be carried out in reverse, with the transmitter and receiver 130 and 132 implemented at the remote device 120, and the receiver 140 and transmitter 142 implemented at the local device 110, with the time-of-flight pertaining to the transmission of the HF signals. In some implementations, such an approach may be carried out, with the time-of-flight being determined at both the local and remote devices, based on LF signals, HF signals or a combination of LF and HF signals. For instance, blocks 112 and 122 and/or blocks 114 and 124 may be implemented as LF transceivers, with an additional LF communication going from block 122 to block 112. Further iterations of the transmission of HF signals may be carried out to fine tune synchronization.

Figure 2:
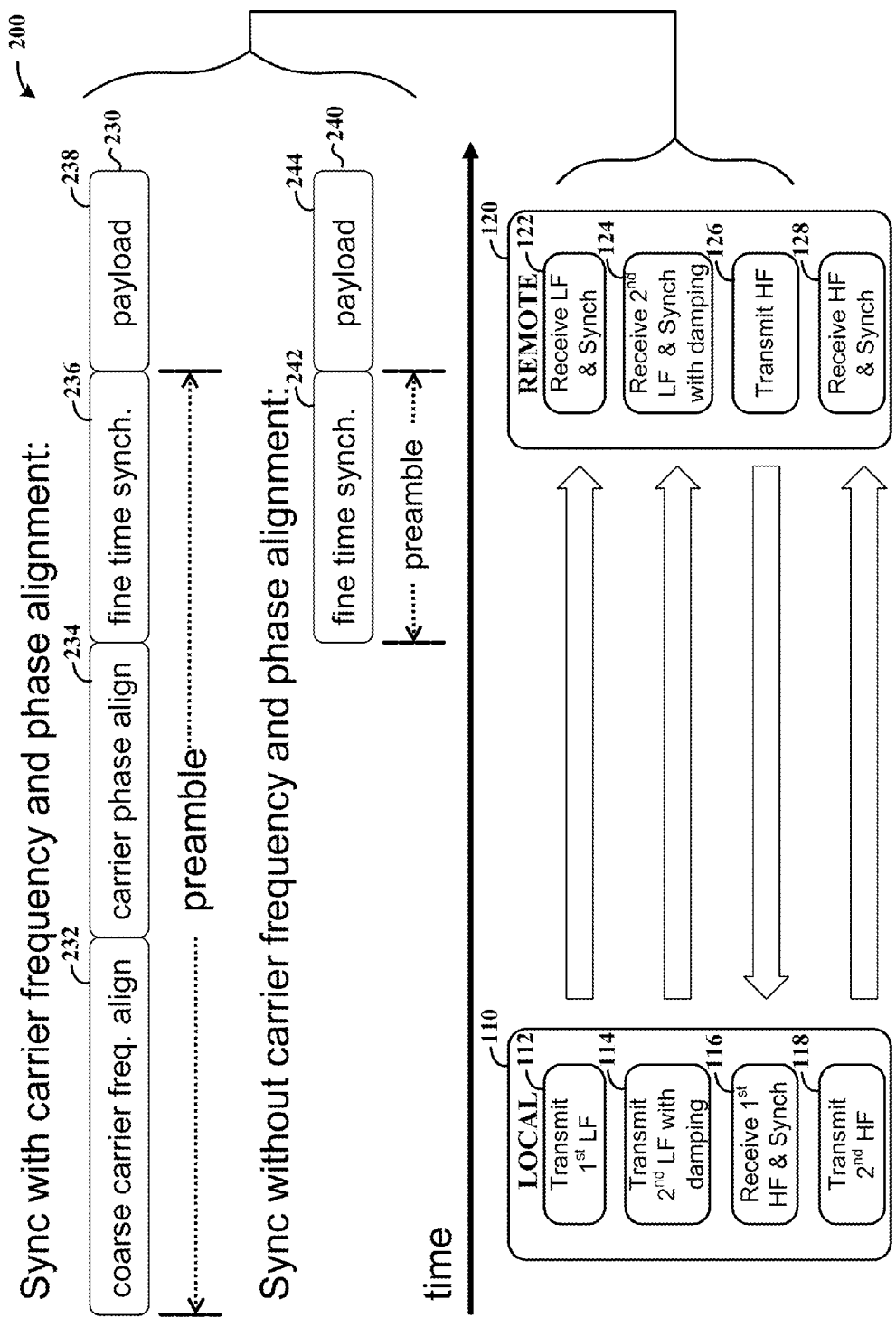
FIG. 2 shows a communication approach, as may be implemented in accordance with one or more embodiments.

FIG. 2 shows a communication approach 200 as may be implemented in accordance with the above-discussed approach in FIG. 1, with similar components at local and remote devices 110 and 120 being consistently labeled. The transmission of data between the local and remote devices 110 and 120 is carried out using a packet, or waveform, that is transmitted for trip time calculation. In some implementations, packet 230 is transmitted with a preamble having coarse carrier frequency alignment data 232, carrier phase alignment data 234, fine time synchronization data 236, and with a payload 238. In other implementations, packet 240 is transmitted having a preamble with fine time synchronization data 242, and a payload 244. Such approaches may be used in a variety of applications. For instance, in low-latency applications such as for automobile access, synchronization may involve a preamble length that exceeds the length of the payload data, as with either packets 230 or 240. In such embodiments, synchronization as characterized with one or more embodiments herein can be carried out, such that the carrier frequency or symbols may not necessarily be used for synchronization.

In a particular embodiment, a side-channel can be used (e.g., in the LF communication at blocks 112/114 and 122/124) to provide coarse synchronization and limit the time needed to do fine synchronization for a main (e.g., HF) channel, in the communication of such packets. As such, a two-step approach is used with an LF transmission that provides coarse synchronization for a transceiver that provides accurate RF ranging. The LF transceiver may include a variety of wireless circuits/links such as, for example, 125 kHz magnetic links or 13.56 MHz NFC links. In one such implementation, LF circuits establish a link and effect polling that may be desired, and provide a first range estimation based on signal strength. Next, the LF circuits provide timing synchronization and pre-synchronization of HF transceivers that carry out RF ranging, which can minimize unnecessary listening and synchronization-related latency. In this way, both power consumption and latency overhead due to RF ranging link can be reduced or minimized.

Figure 3:
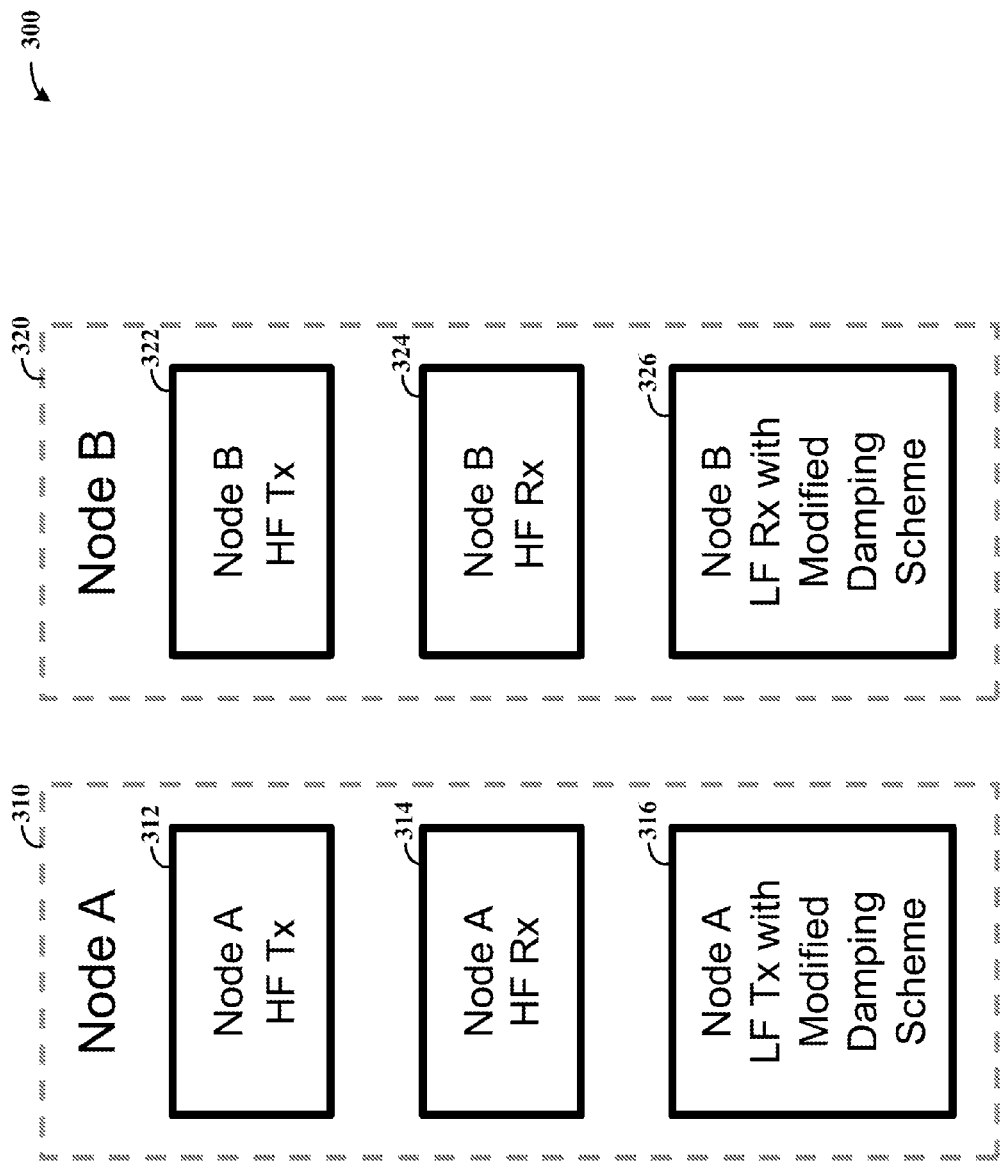
FIG. 3 shows a communication apparatus, in accordance with another example embodiment.

FIG. 3 shows a communication apparatus 300, in accordance with another example embodiment. The communication apparatus 300 includes two communication nodes 310 (depicted as Node A) and 320 (depicted as Node B), which may be implemented as local and remote devices as characterized herein. Node 310 includes HF transmitter 312 and HF receiver 314, which may be combined in an HF transceiver, as well as LF transmitter 316. Node 320 includes an HF transmitter 322 and HF receiver 324, which may be combined in an HF transceiver, as well as LF receiver 326. The respective LF transmitter 316 and receiver 326 operate with a damping scheme, as may be implemented in accordance with one or more embodiments herein. In some implementations, the LF transmitter 316 and LF receiver 326 are transceivers, to facilitate bidirectional LF communications between the nodes 310 and 320.

In a particular implementation, node 310 and node 320 communicate as follows, such as in using a 125 kHz LF signal and a 4.4 GHz IR-UWB RF HF signal. First, the LF transmitter 316 is enabled, based on a trigger or as part of a polling scheme, and the LF receiver 326 is also enabled (e.g., simultaneously, and temporarily). An LF signal is transmitted from LF transmitter 316 at node 310, and the LF receiver 326 at node 320 detects the LF signal, based on a trigger or as part of a continuous listening scheme. The LF receiver 326 at node 320 synchronizes its clock with node 310 based on the LF signal. The LF transmitter 316 then sends a second damped LF signal, using a damping scheme. The LF receiver 326 receives the damped LF signal, and also processes the signal via a damping scheme.

The HF transmitter 322 at node 320 is enabled using the same clock that was used to synchronize at LF, and sends an HF signal to node 310 with a predetermined time delay, relative to an LF packet in the LF signal. The HF receiver 314 at node 310 receives HF signal and synchronizes quickly due to the synchronization of node 320 to the prior LF signal. The HF transmitter 312 is enabled at node 310, and the HF receiver 324 is enabled at node 320. The HF transmitter 312 transmits another HF signal with a predetermined time delay, relative to the HF packet received from node 320 via the initial HF signal. The HF receiver 324 at node 320 receives HF signal, and synchronizes quickly via the synchronization of node 320 to the prior LF signal (and, e.g., the synchronization of node 310 to the prior HF signal). Round-trip calculations can be performed at node 320 and/or node 310, based on the communications.

In some implementations, multiple similar HF messages are exchanged until node 320 holds a sufficiently accurate round-trip time estimate. Where multiple messages are sent, the resulting improved round-trip time estimates can also be kept at node 310. Once the round-trip time estimate is sufficiently accurate, either node 320 sends the encrypted estimate back to node 310, or node 310 already holds the correct estimate (e.g., from a previous calculation). If node 310 determines that node 320 is an intended party (e.g., based on encrypted communications and/or a secure element), and the round-trip time estimate indicates that the distance between the nodes is sufficiently small, access of a user at node 320 to node 310 (e.g., as an access point) can be permitted/unlocked. In some implementations, the direction of the LF communication as discussed above is reversed with respect to the direction of the RF communication. Further, in some implementations node 320 is implemented as an access point that provides access to node 310, with the communications carried out in accordance with the above and verification at node 320.

The damping approaches as carried out in connection with FIG. 3 or otherwise can be implemented in a variety of manners. In some embodiments, switchable parallel tank resistances are used to combat detuning, such as may be presented by a human body (e.g., by reducing the detuning by at least two orders of magnitude, where phase uncertainty scales about linearly with the quality factor of the receiver's resonance tank). Also, the transmitter's resonance tank can be damped to ensure reduction of overall system timing uncertainty. Such approaches may, for example, facilitate synchronization at a range of 2 meters or less.

In some implementations, a transmitter is implemented with a coil inductance and quality factor that are lower than coil inductance and quality factor of a receiver. For instance, in some embodiments, the transmitter (e.g., 310) has a coil inductance of 600 uH with a quality factor of 12, and the receiver (e.g., 320) has a coil inductance of 6 mH, with a quality factor of 20. Parallel damping is used at the transmitter via an impedance that is one order of magnitude lower than an equivalent impedance at the receiver. In addition, the damping resistance in the transmitter may handle much higher power levels than the receiver damping resistance. In certain implementations, damping is carried out by switching immediately to the resistance that corresponds to a target range threshold. The damping may be carried out in single steps, as is common in gain control loops, to maximize the accuracy of an RSSI measurement.

Figure 4:
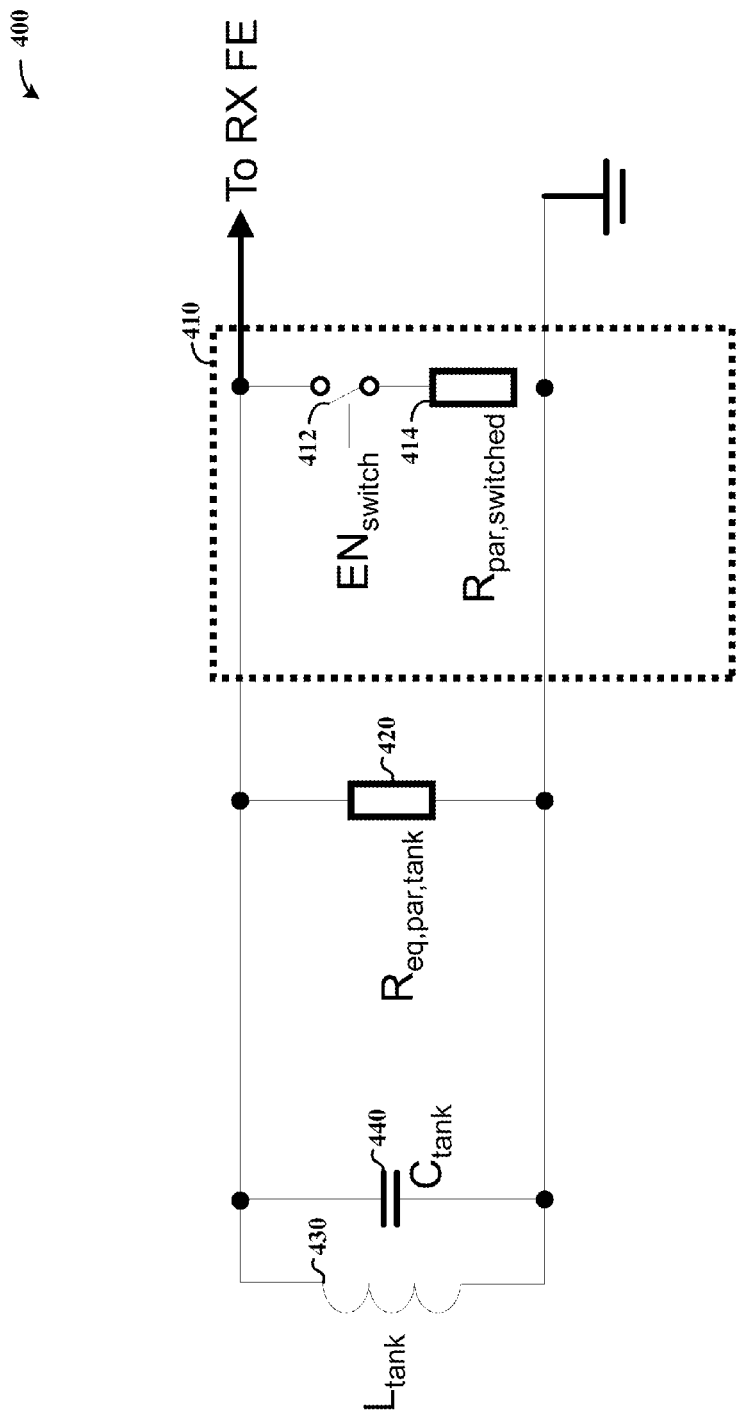
FIG. 4 shows a switched receiver damping apparatus, in accordance with another example embodiment.
Figure 5:
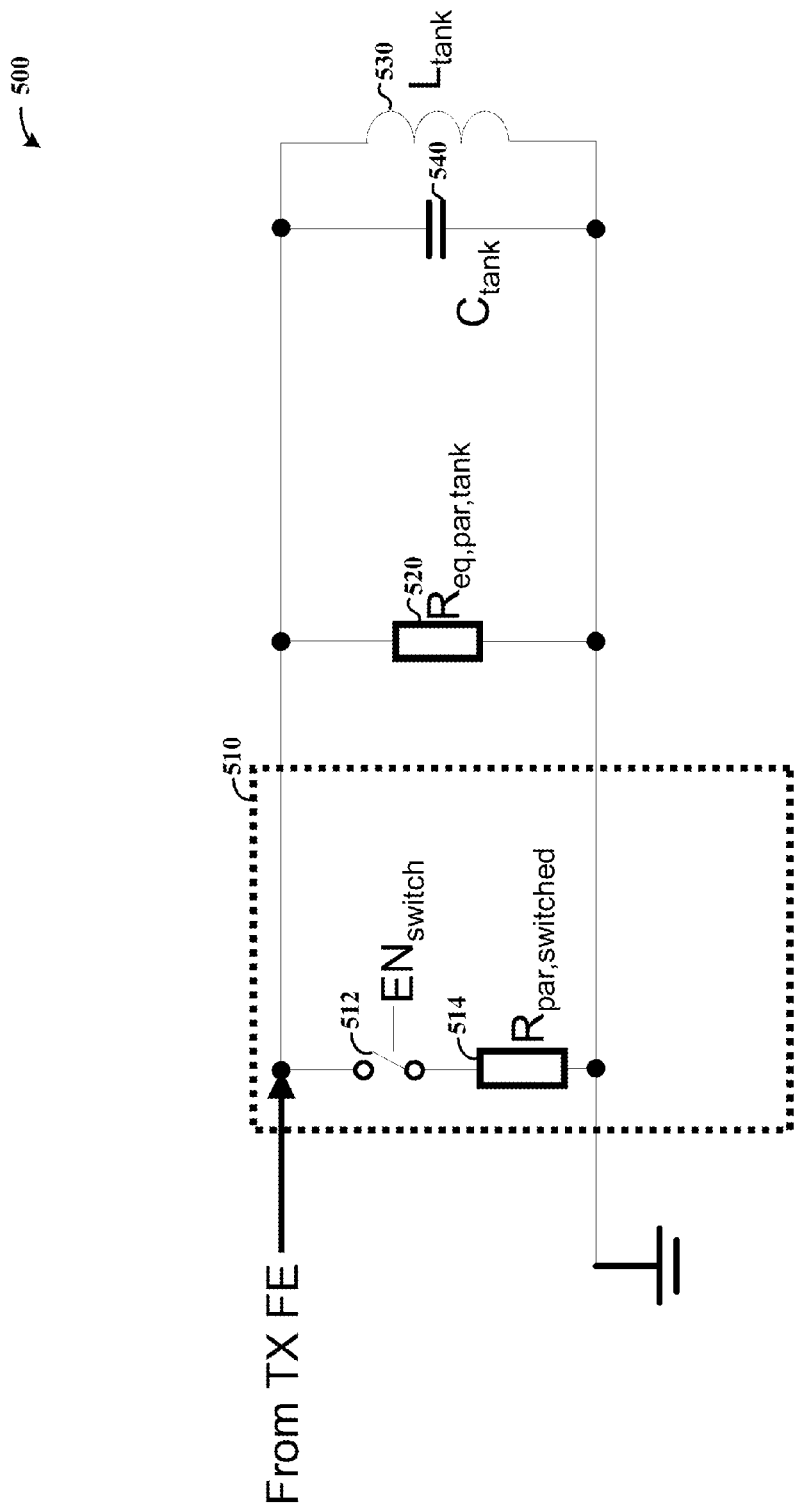
FIG. 5 shows a switched transmitter damping apparatus, in accordance with another example embodiment.

FIG. 4 shows a switched receiver damping apparatus, and FIG. 5 shows a switched transmitter damping apparatus, according to respective embodiments of the invention, which may be combined in a combined apparatus/system embodiment. Each apparatus in FIGS. 4 and 5 have a damping circuit, including damping circuit 410 in FIG. 4 and damping circuit 510 in FIG. 5, respectively having an enable switch 412/512 and a switched resistance 414/514. Each apparatus also includes a parallel RLC circuit, including resistor 420, inductor 430 and capacitor 440 in FIG. 4, and resistor 520, inductor 530 and capacitor 540 in FIG. 5. Resistors 420 and 520 may, in this context, represent an equivalent resistor of a resonant tank. The respective damping circuits operate to damp incoming and outgoing signals. The circuitry shown in FIGS. 4 and 5 may be implemented using a variety of functionally equivalent circuits, with the Norton equivalent shown (e.g., the circuits could be transformed/implemented as a Thévenin equivalent circuit).

A particular embodiment uses a LF channel operating at 125 kHz and a HF channel operating at 4.4 GHz (e.g., an IR-UWB RF channel), which may employ one or more circuits and approaches as shown in the figures (e.g., local and remote devices 310 and 320 of FIG. 3). An LF transmitter at a first (e.g., local) device is enabled based on trigger or as part of a polling scheme, and an HF receiver is enabled (e.g., temporarily) at a second (e.g., remote) device. An LF signal (e.g., including a packet) is transmitted from the first device and an LF receiver at the second device receives the LF signal, based on a trigger or as part of a listening scheme (e.g., continuous). The LF receiver synchronizes a clock at the second device with a clock of the first device, via the LF signal. The LF transmitter and the LF receiver enable respective damping circuits (e.g., which reduce tank Q and thereby reduce impact of detuning on delay variation), using damping resistance values that correspond with a sufficient link distance budget at a target range threshold (e.g., two meters for automotive access applications). The LF transmitter then transmits a second LF signal (e.g., including a packet) and the LF receiver detects the second LF signal and re-synchronizes its clock, using the damping circuitry to facilitate detection of the second LF signal as well as the initial synchronization obtained via the first LF signal.

An HF transmitter at the second device is then enabled using the re-synchronized clock and transmits an HF signal with a predetermined time delay relative to the second LF signal. An HF receiver at the first device receives the HF signal, and synchronizes its clock quickly as facilitated by the re-synchronization to the second LF signal. An HF transmitter at the first device is enabled, as is an HF receiver at the second device, and the first device transmits a second HF signal having a predetermined time delay to the HF signal received from the second device. An HF receiver at the second device receives second HF signal and synchronizes based on this second signal, quickly via the previous synchronization of the second device to the second LF signal.

In some implementations, multiple similar HF messages are exchanged until the second device holds a sufficiently accurate round-trip time estimate (e.g., relative to a threshold, or a limit in variation between respective round-trip time estimates). Where multiple HF messages are sent for such estimations, cumulatively improving round-trip time estimates can be kept at the first device.

Once the round-trip time estimate is sufficiently accurate, either the second device sends the estimate, in encrypted form, back to the first device, or the first device holds the correct estimate from a previous transmission (e.g., as above). If the first circuit can verify that the second circuit is an intended party (e.g., via a secure element or other secure communication), and the round-trip time estimate indicates that the distance between the devices is sufficiently small (e.g., less than a threshold), access to the first device can be provided to a user at the second device.

Various blocks, modules or other circuits may be implemented to carry out one or more of the operations and activities described herein and/or shown in the figures. In these contexts, a "block" (also sometimes referred to as "logic circuitry" or a "module") is a circuit that carries out one or more of these or related operations/activities (e.g., transmitter, receiver or damping). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, certain apparatuses shown in the figures may be separated into embodiments in a single component or node (local/remote device), or combined. Further, certain operations such as synchronization as shown can be carried out in different communication devices, such as by flipping operation of the local and remote devices as described. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. A method for communicating between a local device having a low-frequency (LF) transmitter and a high-frequency (HF) transceiver, and a remote device having an LF receiver and an HF transceiver, the method comprising:
   transmitting a first LF signal from the local device to the remote device;
   at the remote device, synchronizing a first clock based on the first LF signal;
   after transmitting the first LF signal, transmitting a second LF signal from the local device to the remote device using the synchronized first clock, and processing the second LF signal with a reduced quality factor at the local and remote devices, therein facilitating detection of the second LF signal at the remote device with reduced phase ambiguity;
   at the remote device, re-synchronizing the first clock based on the processed second LF signal, and using the re-synchronized first clock to transmit a first HF signal with a first predetermined time delay, relative to receipt of one of the first and second LF signals;
   at the local device, synchronizing a second clock based on the first HF signal, and transmitting a second HF signal to the remote device using the second clock and a second predetermined time delay, relative to receipt of the first HF signal at the local device; and
   at the remote device, re-synchronizing the first clock based on the second HF signal and while accounting for a trip time for at least one of: communicating the first HF signal from the remote device to the local device, and communicating the second HF signal from the local device to the remote device.

2. The method of claim 1, wherein processing the second LF signal includes mitigating detuning effects upon the transmission of the second LF signal, by reducing the quality factor of a tuning circuit by increasing damping of the transmitter in the frequency domain at the local device.

3. The method of claim 1, wherein processing the second LF signal includes mitigating detuning effects upon receipt of the second LF signal, by reducing the quality factor of the second LF signal in the frequency domain at the remote device.

4. The method of claim 1, wherein processing the second LF signal includes mitigating detuning effects upon the communication of the second LF signal by reducing the quality factor of the second LF signal in the frequency domain, at the local device during transmission of the second LF signal, and at the remote device during reception of the second LF signal.

5. The method of claim 1, wherein processing the second LF signal includes reducing an impact of detuning upon delay variation in the second LF signal by reducing a quality factor of a tank resonator used in communicating the second LF signal.

6. The method of claim 1, wherein processing the second LF signal includes switching a damping circuit on during communication of the second LF signal, and processing the second LF signal with a tuning circuit that employs the damping circuit.

7. The method of claim 1, wherein processing the second LF signal includes processing the second LF signal in a tuning circuit with a quality factor that provides communication of the LF signal for authenticating the remote device in a target range of distance between the local and remote devices.

8. The method of claim 1, wherein re-synchronizing the first clock includes re-synchronizing the first clock based on the synchronized first clock and the second LF signal.

9. The method of claim 1, wherein synchronizing the second clock includes synchronizing the second clock using the first predetermined time delay.

10. The method of claim 1, further including:
    communicating encrypted authentication data via the re-synchronized first clock; and
    establishing secure communications between the local and remote devices, based on the encrypted authentication data and a round-trip time for communicating the HF signals indicating that a distance between the local and remote devices is below a threshold distance.

11. The method of claim 1, wherein
    at least one of the local and remote devices operates using duty-cycled packet detection for packets having a preamble that is longer than a payload of the packet,
    the local and remote devices transmit and receive the LF signal respectively using an LF transmitter and an LF receiver, and
    the local and remote devices transmit and receive the HF signals using HF transceivers that are respectively separate from the LF transmitter and the LF receiver, thereby minimizing both power consumption and latency overhead due to RF ranging in the communications.

12. A method for authenticating wireless communications between first and second devices, the method comprising:
    communicating a first low-frequency (LF) signal between the first and second devices, and synchronizing a clock at the first device based on the first LF signal as received at one of the devices;
    after communicating the first LF signal, activating damping circuits at the respective devices, communicating a second LF signal between the devices while using the damping circuits to reduce a quality factor of tuning circuits used at each device for communicating the second LF signal, and re-synchronizing the clock based on the second LF signal;
    using the re-synchronized clock to communicate a first high-frequency (HF) signal from the first device to the second device, the first HF signal including an encrypted message;
    communicating the encrypted message from the second device back to the first device in a second HF signal; and
    authenticating communications between the first and second devices based upon the encrypted message and a round-trip time for transmitting and retransmitting the encrypted message.

13. An apparatus comprising:
    a low-frequency (LF) communication circuit configured and arranged to:
        communicate a first LF signal from a local device to a remote device, and provide synchronization of a first clock circuit at the remote device via the first LF signal, communicate a second LF signal from the local device to the remote device via the synchronized first clock circuit, and facilitating detection of the second LF signal at the remote device with reduced phase ambiguity by reducing a quality factor of the communication, and provide re-synchronization of the first clock circuit via the second LF signal; and a high-frequency (HF) communication circuit configured and arranged to:

communicate a first HF signal from the remote device to the local device with a first predetermined time delay, relative to receipt of one of the first and second LF signals, via the re-synchronized first clock circuit, provide synchronization of a second clock circuit based on the first HF signal, communicate a second HF signal from the local device to the remote device using the second clock circuit and a second predetermined time delay, relative to receipt of the first HF signal at the local device, and provide re-synchronization of the first clock circuit via the second HF signal and a trip time for at least one of, communicating the first HF signal from the remote device to the local device, and communicating the second HF signal from the local device to the remote device.

14. The apparatus of claim 13,
wherein the LF communication circuit and the HF communication circuit are part of the remote device,
wherein the LF communication circuit includes an LF receiver, and further including the first clock circuit.

15. The apparatus of claim 14, further including a tuning circuit in the remote device, the tuning circuit being configured and arranged to receive the LF signals and to operate in a damping mode for receiving the second LF signal by reducing a quality factor of the tuning circuit, relative to a quality factor used for receiving the first LF signal.

16. The apparatus of claim 13,
wherein the LF communication circuit and the HF communication circuit are part of the local device,
wherein the LF communication circuit includes an LF transmitter, and
further including the second clock circuit.

17. The apparatus of claim 16, further including a tuning circuit in the local device, the tuning circuit being configured and arranged to transmit the LF signals and to operate in a damping mode for transmitting the second LF signal by reducing a quality factor of the tuning circuit, relative to a quality factor used for transmitting the first LF signal.

18. The apparatus of claim 13, wherein the LF communication circuit includes an LF transmitter in the local device and an LF receiver in the remote device, and wherein the HF communication circuit includes an HF transceiver in the local device and a HF transceiver in the remote device.

19. The apparatus of claim 18, further including:
the first clock circuit in the remote device;
the second clock circuit in the local device;
a first tuning circuit in the local device, the tuning circuit being configured and arranged to transmit the LF signals and to operate in a damping mode for transmitting the second LF signal by reducing a quality factor of the first tuning circuit, relative to a quality factor used for transmitting the first LF signal; and
a second tuning circuit in the remote device, the tuning circuit being configured and arranged to receive the LF signals and to operate in a damping mode for receiving the second LF signal by reducing a quality factor of the second tuning circuit, relative to a quality factor used for receiving the first LF signal.

20. The apparatus of claim 19,
wherein the HF communication circuit is configured and arranged to communicate an encrypted message from the remote device to the local device via the first HF signal, and to communicate the encrypted message from the local device back to the remote device via the second HF signal;
further including an authentication circuit configured and arranged to authenticate the remote device for accessing the local device based on a round-trip time for communicating the encrypted message from the remote device to the local device, and from the local device back to the remote device;
wherein the first tuning circuit includes a first tank resonator and is configured and arranged to transmit the second LF signal by switching the first tank resonator on and using the first tank resonator to detune the transmission of the second LF signal; and
wherein the second tuning circuit includes a second tank resonator and is configured and arranged to receive the second LF signal by switching the second tank resonator on and using the second tank resonator to detune the reception of the second LF signal.

* * * * *